(12) United States Patent
Hruby et al.

(10) Patent No.: US 9,394,951 B2
(45) Date of Patent: Jul. 19, 2016

(54) CLUTCH UNIT

(75) Inventors: Norbert Hruby, Seiersberg (AT);
Hannes Puck, Stainz (AT); Johannes Quehenberger, Raaba (AT); Ernst Riegler, Kirchschlag (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 151 days.

(21) Appl. No.: 14/345,301

(22) PCT Filed: Sep. 11, 2012

(86) PCT No.: PCT/EP2012/067726
§ 371 (c)(1),
(2), (4) Date: Oct. 16, 2014

(87) PCT Pub. No.: WO2013/041409
PCT Pub. Date: Mar. 28, 2013

(65) Prior Publication Data
US 2015/0027847 A1 Jan. 29, 2015

(30) Foreign Application Priority Data
Sep. 19, 2011 (DE) .......................... 10 2011 113 782

(51) Int. Cl.
*F16D 13/40* (2006.01)
*F16D 13/72* (2006.01)
(Continued)

(52) U.S. Cl.
CPC ................ *F16D 13/40* (2013.01); *F16D 13/58* (2013.01); *F16D 13/72* (2013.01); *F16D 23/12* (2013.01); *B60K 17/344* (2013.01); *B60K 23/08* (2013.01); *F16D 2023/123* (2013.01)

(58) Field of Classification Search
None
See application file for complete search history.

(56) References Cited

U.S. PATENT DOCUMENTS 4,270,647 A * 6/1981 Leber ...................... F16D 13/74
192/113.35
4,544,055 A * 10/1985 Kronstadt ............... F16D 13/74
192/113.36
(Continued)

FOREIGN PATENT DOCUMENTS

CN 1737394 A 2/2006
CN 201149047 Y 11/2008
(Continued)

OTHER PUBLICATIONS

Search Report issued Aug. 18, 2015 in corresponding Chinese Patent Application No. 201280045654.5.

*Primary Examiner* — Huan Le
(74) *Attorney, Agent, or Firm* — Dickinson Wright PLLC

(57) ABSTRACT

A clutch unit for a motor vehicle comprises a friction clutch and an actuator for actuating the friction clutch, the actuator having a first ramp ring and a second ramp ring, of which at least one can be rotated relative to the other ramp ring, in order to exert an axial force on the friction clutch. Furthermore, the clutch unit comprises a metering device for feeding a cooling fluid in a metered manner to the friction clutch. The metering device has a first metering section which is assigned to the first ramp ring, and a second metering section which is assigned to the second ramp ring, the first metering section and the second metering section together delimiting a metering opening for the cooling fluid. The first metering section and the second metering section interact in such a way that the cross section of the metering opening, which cross section is delimited by the metering sections, can be varied by way of a relative rotation of the ramp rings.

20 Claims, 2 Drawing Sheets

(51) Int. Cl.
*F16D 23/12* (2006.01)
*F16D 13/58* (2006.01)
*B60K 17/344* (2006.01)
*B60K 23/08* (2006.01)

(56) References Cited

U.S. PATENT DOCUMENTS

| | | | |
|---|---|---|---|
| 6,848,550 | B2 | 2/2005 | Puiu et al. |
| 2008/0308354 | A1 | 12/2008 | Gratzer et al. |
| 2009/0229905 | A1 | 9/2009 | Kato et al. |
| 2010/0094519 | A1* | 4/2010 | Quehenberger ....... B60K 17/35 701/69 |
| 2011/0036677 | A1* | 2/2011 | Kriebernegg ........... F16D 13/52 192/70.12 |

FOREIGN PATENT DOCUMENTS

| | | |
|---|---|---|
| CN | 1016468768 A | 2/2010 |
| CN | 101813140 A | 8/2010 |
| DE | 102007057984 A1 | 6/2009 |
| DE | 102009005378 A1 | 4/2010 |
| JP | 2008014423 A | 1/2008 |
| WO | 2006015394 A1 | 2/2006 |

* cited by examiner

CLUTCH UNIT

CROSS-REFERENCE TO RELATED APPLICATIONS

This application is a U.S. National phase of International Application No. PCT/EP2012/067726 filed Sep. 11, 2012 and which claims priority to German Application No. 10 2011 113 782.7 filed Sep. 19, 2011. The disclosure of each of the above-noted applications is hereby incorporated herein by reference in its entirety.

TECHNICAL FIELD

The invention relates to a clutch unit for a motor vehicle, having a friction clutch, an actuator for actuating the friction clutch, the actuator having a first ramp ring and a second ramp ring, of which at least one can be rotated relative to the other ramp ring, in order to exert an axial force on the friction clutch, and having a metering device for feeding a cooling fluid in a metered manner to the friction clutch.

BACKGROUND

A clutch unit of this type serves for the selective transmission of torque in a drive train of a motor vehicle. For this purpose, a friction clutch is provided which is typically configured as a multiple disk clutch and makes a continuously variable transmission of the torque possible. An associated actuator is configured in such a way that it exerts a force axially on the friction clutch. To this end, two ramp rings are used which have a plurality of ramps distributed over the circumference, which ramps are inclined with respect to a normal plane with respect to the rotational axis of the friction clutch and interact in pairs. Rolling bodies are preferably provided between the ramps of a pair. If at least one of the ramp rings is rotated (for example, by means of an electric motor or hydraulically), one of the ramp rings is moved axially as a result (the same ramp ring or the other ramp ring). By way of said axial movement, for example, a multiple disk assembly can be pressed together, in order to engage the clutch. U.S. Pat. No. 6,848,550 B2 has disclosed a clutch unit having an actuator which has ramp rings of this type.

One general problem is the development of heat in the case of a slipping friction clutch, for which reason the clutch has to be cooled. To this end, a cooling fluid, in particular oil, is usually used which is guided through the friction clutch. WO 2006/015394 A1 has already disclosed a transfer transmission of an all-wheel-drive motor vehicle, in which the clutch is supplied with lubricating oil. Here, the lubricating oil flows via an opening from an oil reservoir to the clutch.

DE 10 2007 057 984 A1 discloses an all-wheel-drive transfer transmission, in which, with the aid of a delivery device, lubricating oil can be conveyed from an oil sump into an oil reservoir in an upper region of the transmission. The oil flow from the oil reservoir to a friction clutch can be set by way of a metering device.

A disadvantage of cooling and lubricating of this type of a friction clutch is the drag torques which occur and the associated losses, in particular when the clutch is open. If a cooling fluid flows into the clutch in the open state, considerable losses occur on account of the viscosity. In particular in the case of multiple disk clutches, viscous friction is produced in the narrow gap between the clutch disks by way of the cooling fluid which flows in.

This problem has particular significance in what is known as a disconnect system, that is to say in a drive train with a torque transmission section which can be brought to a standstill and is arranged between said friction clutch and a separating clutch (positively locking clutch or likewise friction clutch). A torque transmission section which can be brought to a standstill can be provided, for example, in a motor vehicle having a permanently driven primary axle and a selectively driven secondary axle. In a motor vehicle of this type, the friction clutch can be arranged at an output of an all-wheel-drive transfer transmission and the separating clutch can be arranged in the region of an axle differential gear of the secondary axle (or vice versa). By way of opening of both clutches, the torque transmission section (for example, cardan shaft) which runs between them is brought to a standstill. This can prevent parts of the drive train which are not required in the two-wheel-drive mode (when only the primary axle is driven) also being driven, which would be at the expense of the fuel economy. A drive train of this type having a torque transmission section which can be brought to a standstill is known from DE 10 2009 005 378 A1.

However, an additional loss and therefore an additional heat input can also be produced by a cooling oil flow in a drive train and in transmissions, in which a standstill function of this type is not used, since the oil is conveyed continuously from an oil space into the clutch, is accelerated and moved in the process and is then swirled in the sump again, although no cooling would be necessary in the relevant driving situation.

SUMMARY

It is an object of the invention to provide a clutch unit which makes a metered supply of cooling fluid possible in a simple construction.

The object is achieved by way of a clutch unit having: a friction clutch; an actuator for actuating the friction clutch, the actuator having a first ramp ring and a second ramp ring, of which at least one can be rotated relative to the other ramp ring, in order to exert an axial force on the friction clutch; and a metering device for feeding a cooling fluid in a metered manner to the friction clutch; and wherein the metering device has a first metering section which is assigned to the first ramp ring, and a second metering section which is assigned to the second ramp ring, the first metering section and the second metering section together delimiting a metering opening for the cooling fluid and interacting in such a way that the cross section of the metering opening, which cross section is delimited by the metering sections, can be varied by way of a relative rotation of the ramp rings.

The metering device of the clutch unit in accordance with the invention comprises at least two metering sections which are coupled directly or indirectly to the two ramp rings. By way of movement of the two ramp rings relative to one another (by means of the associated actuator), the metering sections of the metering device can therefore also be moved automatically relative to one another. The metering sections together define a metering opening which determines the volumetric flow of the cooling fluid to the friction clutch. The free cross section of the metering opening is also changed by way of the relative movement of the ramp rings and the corresponding relative movement of the metering sections. This can be brought about, for example, by variable overlapping of the metering sections or by a variable gap between the metering sections.

The advantages which are achieved by way of the invention comprise, in particular, in metering the feed of a cooling fluid to the friction clutch and minimizing drag torques which possibly occur and associated losses, in particular when the clutch is open. Here, the metering takes place in a simple way, by the cross section of the metering opening being varied automatically upon actuation of the clutch. This can be achieved with a simple construction of the metering device and with a small space requirement. Here, the assignment of a first metering section to a first ramp ring and a second metering section to a second ramp ring has proven advantageous. Since the control of the friction clutch takes place via a relative movement of the ramp rings, the inflow of the cooling fluid is also controlled at the same time upon actuation of the friction clutch without any additional control outlay. In particular, the inflow of the cooling fluid can be suppressed completely as a result when the clutch is open.

In conjunction with the invention, the directional specifications (such as "axial" or "radial") relate in general to the rotational axis of the friction clutch.

Advantageous embodiments of the invention can be gathered from the appended claims, the description and the drawings.

In accordance with one embodiment, the first metering section of the metering device is coupled fixedly to the first ramp ring so as to rotate with it, is coupled to it in a manner which is effective for drive or is of integral configuration with it. The second metering section can be fixedly coupled here to the second ramp ring so as to rotate with it, be coupled to it in a manner which is effective for drive or be of integral configuration with it. Coupling which is effective for drive can take place, for example, via a drive device or slotted guide in such a way that the movement of the respective metering section takes place only in the axial direction or only in the radial direction.

In accordance with a further embodiment, the metering sections interact in such a way that the metering opening is closed substantially completely, that is to say apart from any leakage losses, in a predefined clutch state, in order thus to suppress the flow of cooling fluid as far as possible. This can be provided, in particular, when a friction clutch is open completely, in order to minimize drag torques and the associated efficiency losses in a drive train having a torque transmission section which can be brought to a standstill. In a drive train of this type, very high rotational speed differences (for example, between the inner disks and the outer disks of a multiple disk clutch) namely occur within the friction clutch at the end of the torque transmission section which is brought to a standstill.

The metering sections of the metering device can be arranged, for example, so as to lie radially on the inside with regard to the ramp rings. As a result, coupling of the metering sections to the ramp rings is possible which is structurally simple and space-saving.

The friction clutch can have friction disks which are arranged downstream of the metering opening with regard to the flow direction of the cooling fluid.

The cooling fluid flows through the metering opening, for example, in the radial direction. As an alternative or in addition, it can be provided that the cooling fluid flows through the metering opening in the axial direction and/or in the circumferential direction.

In accordance with one advantageous embodiment, the metering sections of the metering device have overlapping cylinder face sections, at least one of the metering sections having at least one cutout as metering opening. The use of cylinder face sections represents a possibility to realize a metering opening of variable size upon rotation and simultaneous axial movement (induced by the movement of at least one ramp ring). Other suitable forms are also conceivable.

Cutouts are preferably present on both metering sections, which cutouts can be brought into partial or complete alignment, in particular, by way of the relative rotation of the ramp rings. In one specific embodiment, one metering section which is assigned to a stationary ramp ring is likewise stationary here, whereas the other metering section which is assigned to the rotatable ramp ring is movable.

In accordance with a further embodiment, the cylinder face sections bear substantially tightly, that is to say apart from any leakage losses, against one another outside the metering opening, in order to avoid an uncontrolled flow of cooling fluid.

In order to achieve an inexpensive and compact design of the metering sections, the metering sections of the metering device are composed, for example, of plastic. In particular, they can be fastened to the respective ramp ring by means of a latching connection for rapid assembly.

Furthermore, the clutch unit can have a cooling fluid reservoir which is arranged upstream of the metering device with regard to the flow direction of the cooling fluid. A cooling fluid reservoir of this type can serve to buffer store cooling fluid which is conveyed by means of a delivery device, for example, from a sump in the direction of the clutch unit and is retained, however, in the cooling fluid reservoir if required by means of the metering device. Said cooling fluid delivery device can comprise, for example, a pump or can be formed by rotating parts of the friction clutch itself (for example, clutch drum) or by moving parts of an associated transmission (for example, chain of an offset drive of a transfer transmission). A cooling fluid line preferably leads from the cooling fluid reservoir to the metering opening of the metering device, it being possible for at least part of said cooling fluid line to be formed, for example, by a hole in a shaft.

For an efficient operating mode, it can be provided, in particular, that the volume of said cooling fluid reservoir is sufficiently large, in order, in the case of a closed metering opening, to be able to accommodate part of the cooling fluid such that the level of the cooling fluid lies below the rotating parts of the friction clutch or of the associated transmission downstream of the metering device (in particular, also below the clutch drum or the inner disks of the friction clutch). It can therefore be prevented if required that rotating parts of the friction clutch or the associated transmission run in the oil bath. As a result, undesired splash losses and drag torques can be avoided, in order to improve the degree of efficiency.

The invention also relates to a drive train of a motor vehicle, which drive train comprises a clutch unit of the type which has been explained and, in addition, a separating clutch. The torque transmission section of the drive train runs between the clutch unit and the separating clutch, it being possible for the torque transmission section to be brought to a standstill by way of opening of the friction clutch and the separating clutch. The flow of cooling fluid within the friction clutch can therefore be interrupted in the case of a torque transmission section which is brought to a standstill, by way of the metering device which is contained in the clutch unit.

DRAWINGS

In the following text, the invention will be described purely by way of example using advantageous embodiments with reference to the appended drawings, in which.

DESCRIPTION

Figure 1A:
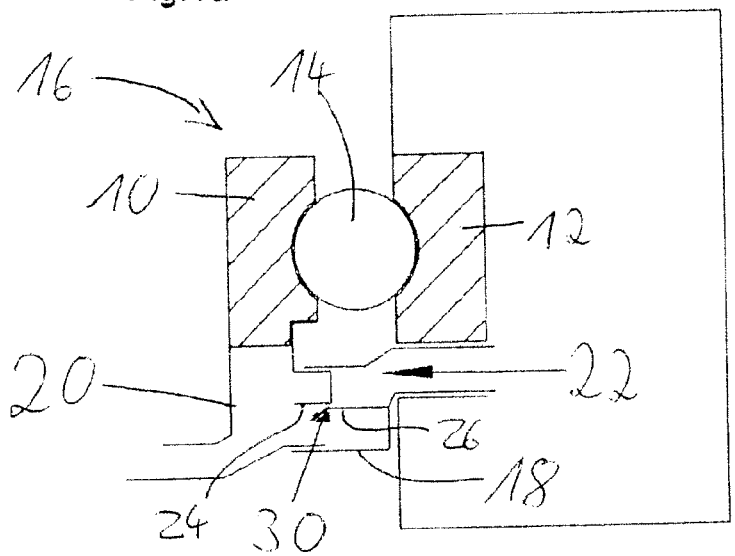
FIG. 1a illustrates a longitudinal sectional view of parts of a clutch unit in the open state.
Figure 1B:
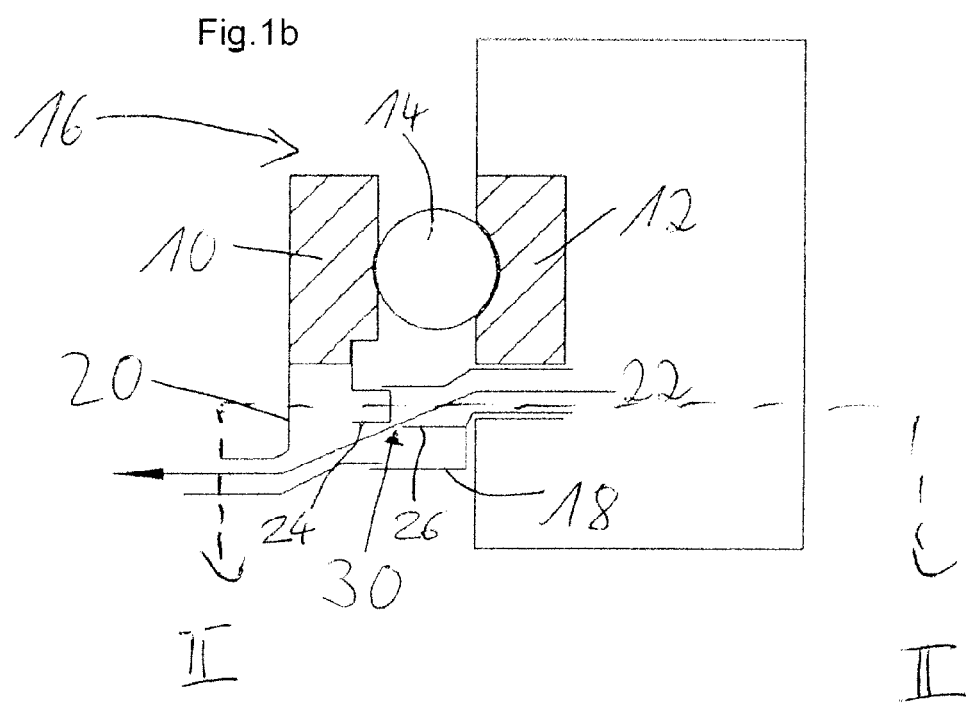
FIG. 1b illustrates the clutch unit in the engaged state.

The clutch unit which is illustrated in FIGS. 1a and 1b has an integrated metering device for a cooling fluid for cooling and lubricating a friction clutch of the clutch unit. The friction clutch is not illustrated here.

The clutch unit comprises a first ramp ring 10 and a second ramp ring 12, between which a plurality of rolling bodies 14 are situated. Together with an associated drive device (for example, electric motor (not illustrated)), said elements form an actuator 16 for the friction clutch. The second ramp ring 12 is stationary here (that is to say, fixed in terms of rotation and axially fixed), whereas the first ramp ring 10 can be rotated relative to the second ramp ring 12 and is movable axially. As an alternative, it is also possible, for example, that both ramp rings 10, 12 are rotated in opposite directions, the second ramp ring 12 being supported axially and the first ramp ring additionally being movable axially. In accordance with a further alternative, the second ramp ring 12 can be rotatable, but axially fixed, whereas the first ramp ring 10 is held fixedly in terms of rotation, but is movable axially.

Starting from the basic position (illustrated in FIG. 1a) of the actuator 16 (open friction clutch), a rotation of the first ramp ring 10 by means of the drive device causes the first ramp ring 10 to be braced by the second ramp ring 12 via the rolling bodies 14 and as a result to actuate the friction clutch in the axial direction, namely in the closing direction. Here, the rolling bodies 14 move along ramps which run in the circumferential direction on the ramp rings 10, 12. The state of the clutch unit which is achieved by way of a movement of this type is illustrated in FIG. 1b (engaged friction clutch). The opening of the friction clutch then takes place in the reverse direction, it being possible for one or more springs (for example, disk springs) to assist the opening movement of the clutch.

Said metering device comprises a first metering section 20 and a second metering section 18 which are arranged radially within the ramp rings 10, 12. The first metering section 20 is connected rigidly to the ramp ring 10, whereas the second metering section 18 is connected rigidly to the ramp ring 12. The arrow 22 describes the flow direction of the cooling fluid which flows, for example, from a cooling fluid reservoir (not illustrated) via the metering device ultimately in the direction of the friction clutch (for example, clutch disks). For example, the cooling fluid can be guided from the (for example, axially offset) cooling fluid reservoir via the metering device into a radially inner region of the friction clutch and, from there (in the case of a rotating clutch), can be guided radially to the outside by the centrifugal force.

The two metering sections 18, 20 can be manufactured, for example, as simple injection moulded parts from plastic which are fastened to the ramp rings 10, 12 by means of a latching connection. The metering sections 18, 20 have cylinder face sections 24, 26 which overlap at least partially, as will still be explained in conjunction with FIGS. 2a and 2b.

The two metering sections 18, 20 together delimit a metering opening 30 of variable size (free cross section), in order to make an adjustable volumetric flow of cooling fluid to the friction clutch possible. In FIG. 1a (open friction clutch), the metering opening 30 is closed, that is to say no cooling fluid passes through. In FIG. 1b, the state is illustrated during or after a relative rotation of the ramp rings 10 and 12 with respect to one another, which relative rotation has led to an axial displacement of the ramp rings 10, 12 relative to one another (partially or completely engaged friction clutch). As a result of the rigid coupling of the metering sections 18, 20 to the respective ramp rings 10, 12, the metering sections 18, 20 are also displaced axially with respect to one another. The cross section of the metering opening 30 has therefore been changed and permits a flow of the cooling fluid.

Figure 2A:
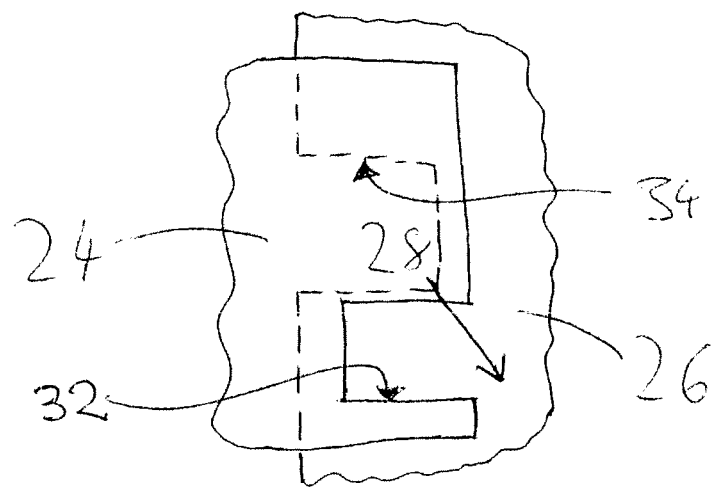
FIG. 2a illustrates a developed view of cylinder face sections of a metering device of the clutch unit in the case of an open clutch.
Figure 2B:
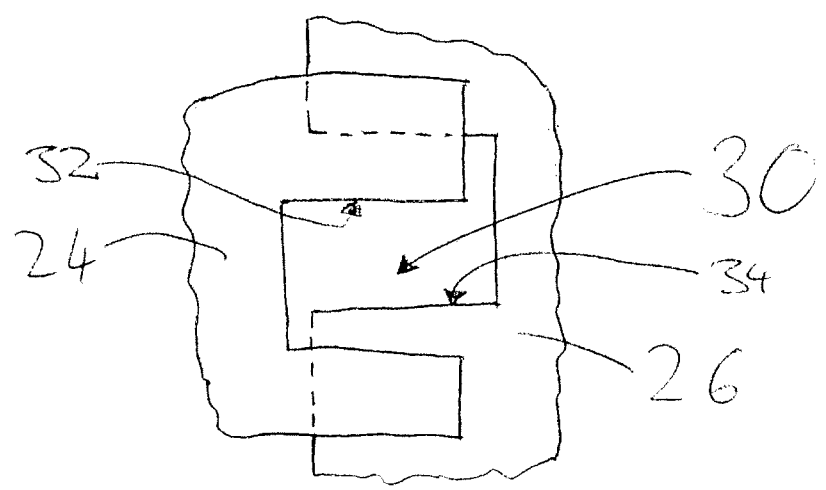
FIG. 2b illustrates a developed view of the cylinder face sections in the case of an engaged clutch.

FIGS. 2a and 2b illustrate the developed views of the overlapping cylinder face sections 24, 26 of the metering sections 18, 20 (view along the cylinder face II-II in accordance with FIG. 1b). FIG. 2a illustrates the basic position, in which the clutch is open. In this state, the metering opening 30 is closed, that is to say substantially no cooling fluid flows. The arrow 28 indicates a rotation of the metering sections 18, 20 with a superimposed axial relative movement. The state which results therefrom and corresponds to an engaged clutch is illustrated in FIG. 2b. Here, cutouts 32, 34 of the cylinder face sections 24, 26 have been brought partially into alignment by way of the relative rotation (radial orientation relative to one another) and form the metering opening 30, through which the cooling fluid can flow.

The clutch unit which is illustrated therefore makes a metered feed of cooling fluid to the friction clutch possible with a simple construction of the metering device and a low space requirement, the setting of the fluid flow taking place automatically with the actuating of the friction clutch.

LIST OF REFERENCE SIGNS

10 First ramp ring
12 Second ramp ring
14 Rolling body
16 Actuator
18 Second metering section
20 First metering section
22 Flow direction of the cooling fluid
24 Cylinder face section
26 Cylinder face section
28 Relative movement of the metering sections
30 Metering opening
32 Cutout
34 Cutout

What is claimed is:

1. A clutch unit for a motor vehicle, comprising:
   a friction clutch;
   an actuator for actuating the friction clutch, the actuator having a first ramp ring and a second ramp ring, of which at least one can be rotated relative to the other ramp ring, in order to exert an axial force on the friction clutch; and
   a metering device for feeding a cooling fluid in a metered manner to the friction clutch;
   wherein the metering device has a first metering section which extends from the first ramp ring, and a second metering section which extends from the second ramp ring, the first metering section and the second metering section together defining a metering opening for feeding the cooling fluid to the friction clutch and interacting in such a way that a cross section of the metering opening, which cross section is delimited by the metering sections, can be varied by way of a relative rotation of the first and second metering sections in response to relative rotation of the ramp rings.

2. The clutch unit as claimed in claim 1, wherein the first metering section is coupled fixedly to the first ramp ring so as to rotate with it, is indirectly coupled to the first ramp ring in a manner which is effective for drive, or is of an integral configuration with the first ramp ring, and wherein the second metering section is coupled fixedly to the second ramp ring so as to rotate with it, is indirectly coupled to the second ramp ring in a manner which is effective for drive, or is of an integral configuration with the second ramp ring.

3. The clutch unit as claimed in claim 1, wherein the metering sections interact in such a way that the metering opening is closed substantially completely in a predefined clutch state.

4. The clutch unit as claimed in claim 1, wherein the metering sections of the metering device are arranged so as to lie radially inwardly with respect to the ramp rings.

5. The clutch unit as claimed in claim 1, wherein the first and second metering sections of the metering device are composed of plastic.

6. The clutch unit as claimed in claim 1, wherein the clutch unit further comprises a cooling fluid reservoir which is arranged upstream of the metering device with regard to the flow direction of the cooling fluid.

7. A drive train of a motor vehicle, having a clutch unit as claimed in claim 1 and having a separating clutch, between which a torque transmission section of the drive train runs, it being possible for the torque transmission section to be brought to a standstill by way of opening of the friction clutch and the separating clutch.

8. The clutch unit as claimed in claim 1 wherein the first metering section extends axially from the first ramp ring in a direction toward the second metering section, and wherein rotary movement of the first metering section relative to the second metering section causes the cross section of the metering opening to be varied.

9. The clutch unit as claimed in claim 1 wherein varying the cross section of the metering opening regulates the volumetric flow of the cooling fluid supplied to the friction clutch, wherein the first metering section includes a first cylindrical face section defining a first cutout and the second metering section includes a second cylindrical face section defining a second cutout, wherein the first face section overlaps the second face section such that relative rotation between the first and second metering sections in a first direction acts to misalign the first and second cutouts and establish a first cross section for the metering opening, wherein relative rotation between the first and second metering sections in a second direction acts to align the first and second cutouts and establish a second cross section for the metering opening, and wherein the second cross section is larger than the first cross section with the first cross section established when the friction clutch is in an open state and the second cross section established when the friction clutch is in an engaged state.

10. The clutch unit as claimed in claim 1, wherein the first and second metering sections have corresponding first and second cylinder face sections arranged in an overlapping configuration, and wherein at least one of the first and second metering sections has at least one cutout, in order to form the metering opening.

11. The clutch unit as claimed in claim 10, wherein the first and second cylinder face sections bear substantially tightly against one another outside the metering opening.

12. A clutch unit for a motor vehicle, comprising:
a friction clutch;
an actuator for actuating the friction clutch, the actuator having a first ramp ring and a second ramp ring at least one of which can be rotated relative to the other for exerting an axial force on the friction clutch; and
a metering device for supplying a cooling fluid in a metered manner to the friction clutch, the metering device having a first metering section extending from the first ramp ring and a second metering section extending from the second ramp ring, the first and second metering sections cooperating to define a metering opening for the cooling fluid, and wherein a cross section of the metering opening is varied as a function of relative rotation between the first and second metering sections in response to relative rotation between the first and second ramp rings so as to regulate the volumetric flow of the cooling fluid supplied through the metering opening to the friction clutch.

13. The clutch unit as claimed in claim 12 wherein the first metering section extends axially from the first ramp ring in a direction toward the second metering section, and wherein rotary movement of the first metering section relative to the second metering section acts to vary the cross section of the metering opening.

14. The clutch unit as claimed in claim 12 wherein the first metering section extends from the first ramp ring in a direction toward the second metering section, and wherein at least one of a rotary movement and an axial movement of the first metering section relative to the second metering section causes the cross section of the metering opening to be varied.

15. The clutch unit as claimed in claim 12 wherein varying the cross section of the metering opening regulates the volumetric flow of the cooling fluid supplied to the friction clutch, wherein the first metering section includes a first cylindrical face section defining a first cutout and the second metering section includes a second cylindrical face section defining a second cutout, wherein the first face section overlaps the second face section such that relative rotation between the first and second metering sections in a first direction acts to misalign the first and second cutouts and establish a first cross section for the metering opening, wherein relative rotation between the first and second metering sections in a second direction acts to align the first and second cutouts and establish a second cross section for the metering opening, and wherein the second cross section is larger than the first cross section with the first cross section established when the friction clutch is in an open state and the second cross section established when the friction clutch is in an engaged state.

16. The clutch unit as claimed in claim 12, wherein the first ramp ring is axially moveable relative to the friction clutch in response to relative rotation between the first and second ramp rings, and wherein such axial movement of the first ramp ring causes corresponding axial movement of the first metering section relative to the second metering section for varying the cross section of the metering opening.

17. The clutch unit as claimed in claim 16, wherein the first ramp ring is rotatable and the second ramp ring is nonrotatable, wherein rotation of the first ramp ring relative to the nonrotatable second ramp ring causes the first ramp ring to move axially relative to the friction clutch and causes corresponding rotary and axial movement of the first metering section relative to the second metering section, and wherein at least one of the rotary and axial movement of the first metering section relative to the second metering section acts to vary the cross section of the metering opening.

18. The clutch unit as claimed in claim 12 wherein in a first relatively rotated position between the first and second ramp rings the first and second metering sections establish a first cross section for the metering opening, wherein in a second relatively rotated position between the first and second ramp rings the first and second metering sections establish a second cross section for the metering opening, and wherein the second cross section is larger than the first cross section.

19. The clutch unit as claimed in claim 18 wherein the first cross section for the metering opening is established when the friction clutch is in a non-actuated state, and wherein the second cross section for the metering opening is established when the friction clutch is in an actuated state.

20. A clutch unit for a motor vehicle comprising:
a friction clutch;
an actuator for actuating the friction clutch, the actuator including a first ramp ring and a second ramp ring at least one of which can be rotated relative to the other for causing axial movement of the first ramp ring and exerting an axial force on the friction clutch; and
a metering device for metering the supply of a cooling fluid from a cooling fluid reservoir to the friction clutch, the metering device having a first metering section extending from the first ramp ring and a second metering section extending from the second ramp ring, the first and second metering sections cooperating to define a metering opening, wherein a cross section of the metering opening is varied as a function of at least one of relative rotary movement and relative axial movement between the first and second metering sections in response to relative movement between the first and second ramp rings, and wherein varying the cross section of the metering opening regulates the volumetric flow of the cooling fluid supplied from the cooling fluid reservoir to the friction clutch.

* * * * *